Figure 3:
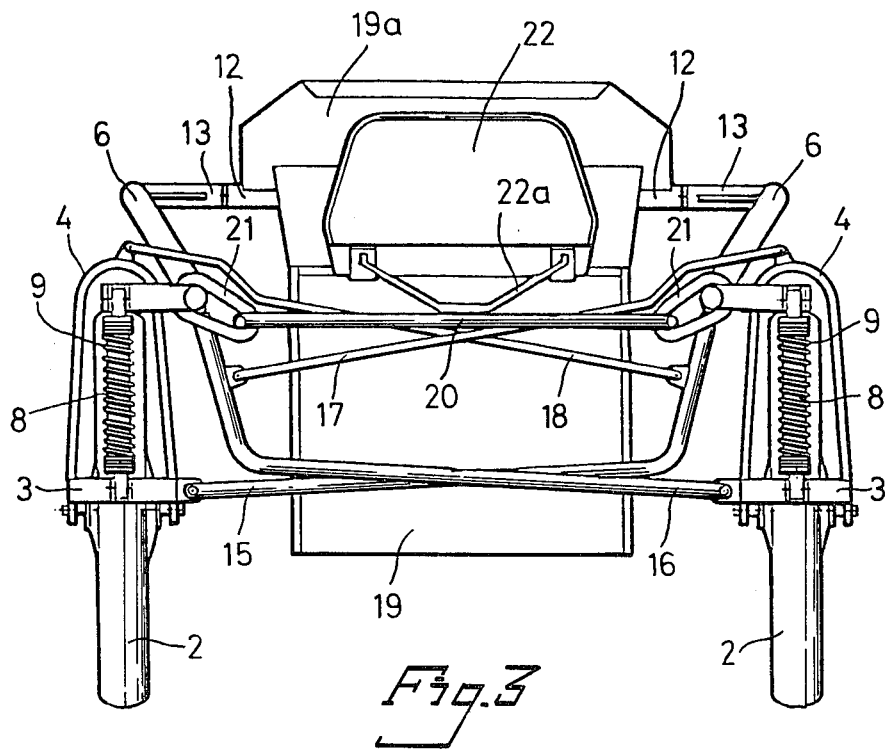

United States Patent [19]

Forslund

[11] 4,392,663
[45] Jul. 12, 1983

[54] TRAINING CART

[76] Inventor: Gösta Forslund, S-780 45 Björbo, Sweden

[21] Appl. No.: 274,671

[22] Filed: Jun. 17, 1981

[30] Foreign Application Priority Data

Jun. 19, 1980 [SE] Sweden ................................ 8004594

[51] Int. Cl.³ .............................................. B62C 1/08
[52] U.S. Cl. .......................................... 280/68; 54/2;
 188/290; 188/293; 280/75
[58] Field of Search ................... 54/50, 51, 2; 280/63,
 280/64, 65, 66, 67, 68, 70, 71, 72, 75, 76, 77;
 119/29; 188/290, 293, 292

[56] References Cited

U.S. PATENT DOCUMENTS

| 288,757 | 11/1883 | Bach | 280/68 |
|---|---|---|---|
| 763,453 | 6/1904 | Alexander | 54/51 |
| 804,386 | 11/1905 | Dain | 280/65 |
| 2,892,514 | 6/1959 | Gornos | 280/63 |
| 3,388,921 | 6/1968 | Pickard | 280/63 |
| 4,135,730 | 1/1979 | Yunick | 280/65 |

FOREIGN PATENT DOCUMENTS

| 350738 | of 0000 | Sweden | 280/63 |
|---|---|---|---|
| 8102210 | of 0000 | Sweden | 280/63 |

Primary Examiner—David M. Mitchell
Attorney, Agent, or Firm—Steele, Gould & Fried

[57] ABSTRACT

A two-wheeled cart for training trotters, wherein the cart frame comprises two longitudinal rigid thill members, which at a central part thereof are pivotally connected through a cross connecting member to be vertically rotatable in relation to each other, wherein each wheel is individually resiliently suspended at a rear part of the respective thill member, and wherein a seat supporting cart member is separately resiliently suspended by the cart frame. A device for adjustable loading of the cart comprises hydraulic pump means arranged to load the wheels.

10 Claims, 5 Drawing Figures

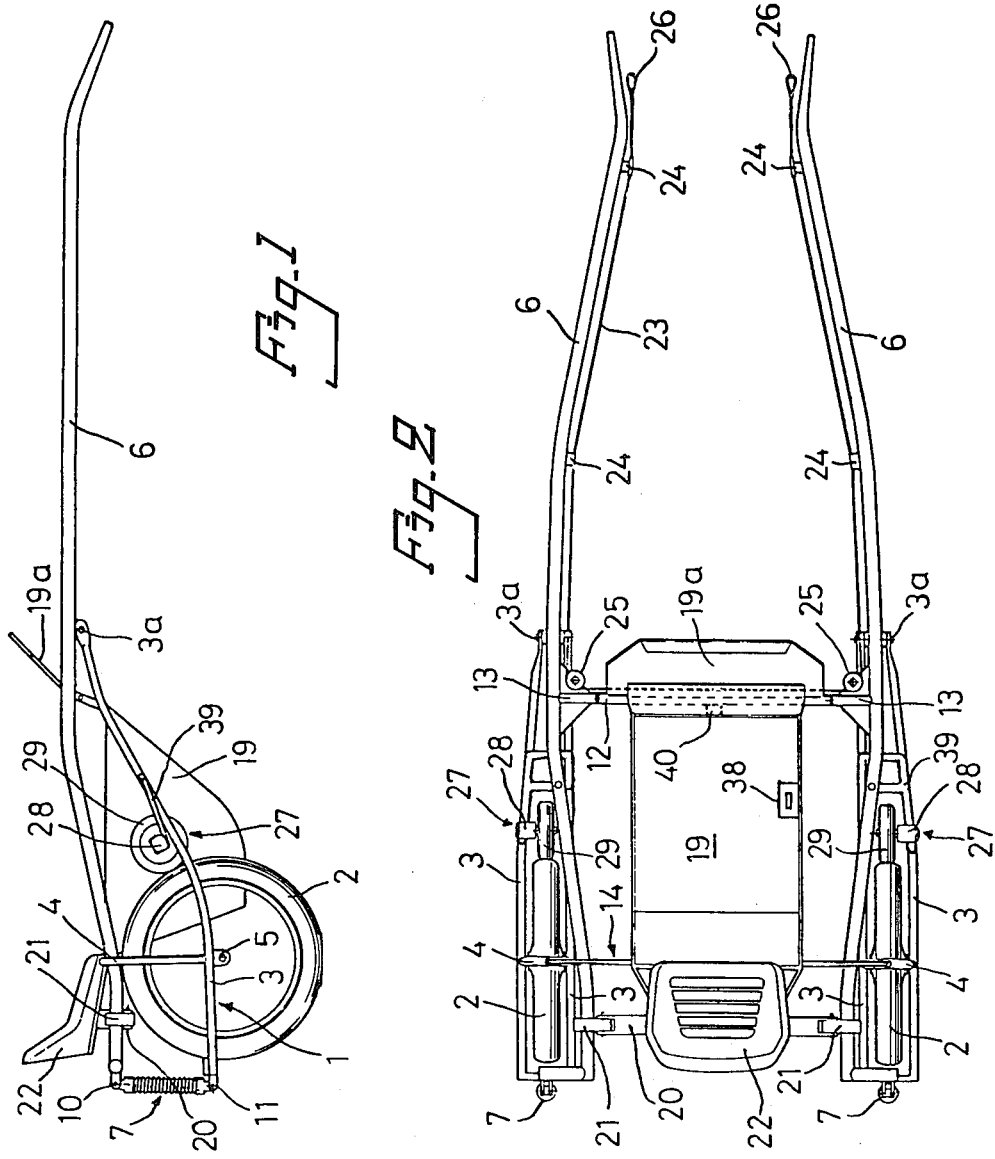

TRAINING CART

The present invention relates to an improved cart for training trotters which gives substantially reduced strains on both the trainer and horse, thereby reducing the risk of injuries and increasing the comfort.

The carts hitherto used for training driving have been unsprung carriages having a rigid structure. Since training frequently takes place on forest tracks and the like having an uneven road surface both the horse and the driver are subjected to severe strains. These strains may give rise to injuries to the driver's back and kidneys, injuries which up to now have been typical occupational disorders amoung trotting trainers. The invention inter alia relates to eliminating these disadvantages. This is achieved through a cart having the features stated in the subsequent claims and further described below.

The training cart according to the invention has a pivoted, resilient construction providing a smooth and vibrationless ride. The construction is characterized in that the wheels and the seat supporting part or cart body are suspended in separate but cooperating spring systems, and that the thills are connected to each other in a vertically pivoting relationship. Suitably the cart further comprises a stabilizing tie rod construction holding the wheel suspensions together and providing lateral stability.

A usual type of injuries to the horse are rubbing or frictional injuries caused by the breast strap of the harness due to the fact that the traction lines fixed to the harness are rigidly attached to the thills. This problem is eliminated according to a preferred embodiment of the invention through a new traction line construction having a line movably connected to the thills and running along the same and via pulleys or the like in the rear part of the thill fork.

Another usual type of injuries to the horse are injuries to the horse's back and legs in connection with loading of the carriage, so-called draying. Said draying has hitherto been effected by dragging tyres or other objects after the cart. Injuries arise primarily through the pulls and jerks which result from dragging the loading object after the cart, particularly when the training takes place on an uneven gravel road, which is the most usual case, and the uneven load that the horse is subjected to since the tyre etc. cannot be centered to always load the center of the cart. This problem is solved through a further preferred embodiment of the invention by providing the training cart with a hydraulic loading device, which acts upon the cart wheels, the loading work substantially being taken up by the hydraulic fluid. Through such a construction the whole cart becomes a "dray." The hydraulic fluid heated on loading may, if desired, be used for heating the cart body in cold and damp weather. Such a hydraulic loading device may for example comprise one or more hydraulic pumps in combination with valve means through which the hydraulic pressure—and thereby the load — can be controlled steplessly.

Figure 4:
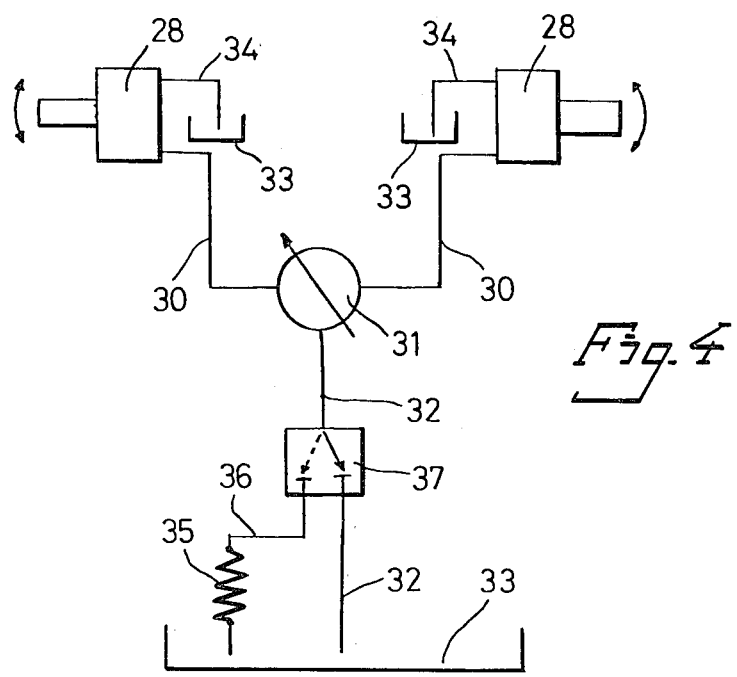
Figure 5:
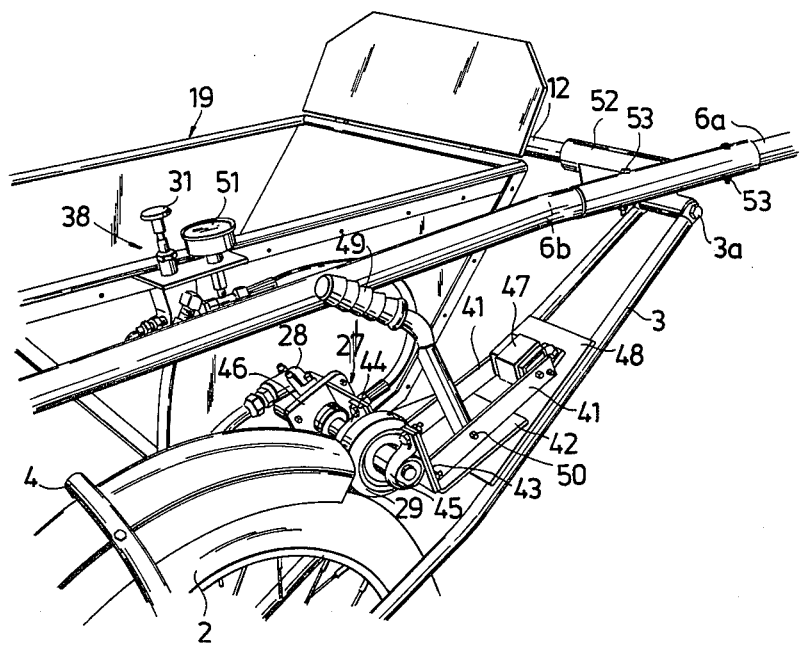

In the following an embodiment of the training cart according to the invention is described with reference to the accompanying drawings, wherein:

FIG. 1 is a side-elevation of an embodiment of the training cart of the invention, FIG. 2 is a top plan view of the embodiment of FIG. 1, FIG. 3 is a rear view of the embodiment in FIG. 1 and 2, FIG. 4 is a principal diagram of an embodiment of a hydraulic loading device according to the invention, and FIG. 5 is a a perspective partial view of an embodiment of the training cart of the invention showing an example of a hydraulic loading arrangement.

The cart shown in FIG. 1-3 comprises two separate wheel suspension structures 1, each carrying a wheel 2 of a conventional type. Each wheel suspension structure 1 comprises an elongate wheel fork 3, stiffened by a substantially vertically mounted wheel bow 4. In the shown case the wheel 2 is journalled in a downwardly directed fork portion 5 protruding in the extension of the bow 4. Each wheel fork 3 is pivotally connected at its front end to a thill 6 via a pivot joint 3a. At the rear parts the frame forks 3 are connected to the respective thill 6 via resilient means 7. The resilient or springing means 7 may, for example as in the Figures, consist of a preferably adjustable hydraulic shock absorber 8 mounted inside a helical spring 9. The spring means 7 are pivotally connected to the thill and wheel fork 3, respectively, via upper and lower pivot joints 10 and 11. The thills 6 are connected in a vertically pivoting relationship through a transverse connecting member 12. The pivoted mounting may, for example, be achieved by the connecting member 12 being provided with threaded end portions screwed into correspondingly threaded tube portions 13 welded to the respective thill 6. To facilitate mounting and dismounting, the thread connections of the connecting member 12 are suitably oppositely threaded. Alternatively, the connecting member 12 may be journalled in the tube portions 13, possibly by means of a suitable bushing, and kept in position e.g. by a slot/stop screw-arrangement. At their rear parts the thills 6 and the wheel suspension structures 1 are held together by a tie rod construction 14. The latter may be arranged as in FIG. 3 and comprise two lower rods 15 and 16, and two upper rods 17 and 18. The lower rods 15 and 16 are at one end thereof vertically pivotally connected to a wheel fork 3 each, and at the opposite end correspondingly pivotally connected to the rear part of the respective thill 6 on the other side of the cart, for example through fork members fixed to or integral with the undersides of the thills. The upper rods 17 and 18 are each vertically pivotally attached on one hand to the top part of a wheel bow 4 each, and on the other hand to the lower rod 15 or 16, respectively, which is journalled to the corresponding wheel fork 3, at the upturned portion of the rod on the other side of the cart. The above tie rod construction may, of course, be modified in various ways. For example, substantially straight rods may be used, and likewise the points of attachment, such as on the wheel bow 4, may be varied. Finally, the cart supports a driver's section or cart body 19, e.g. essentially of sheet metal, having a foot plate 19a. The body 19 is at its front part fixed to the connecting member 12 (and thereby pivotally journalled in relation to the thills 6). At its rear end the body 19 comprises a transverse, horizontal rod or bar 20, the end parts of which are suspended in the thills 6 through resilient means 21, e.g. suitably dimensioned rubber bands. To the bar 20 a seat 22 is attached via a fastening bracket 22a, e.g. by means of bolting. The cart body 19 is suitably pivotally attached to the connecting member 12 through means which permit rotation of the body about an axis in the longitudinal direction of the cart. This may, for example, be achieved through a pin member attached to the cart body and pivoted in the connecting member or rod 12, or vice versa (as indicated at 40 in FIG. 2). Hereby the cart body 19 gets a very advantageous resilient and pivoted three-point suspension.

Through the above described combination of resilience, suspension of the cart body, stabilizing tie rods and pivotal construction of the cart according to the invention a smooth and vibrationless motion is achieved even on relatively uneven surfaces. Due to the above described particular suspension of the cart body 19, the latter will all the time retain a substantially plane position independently of the vertical movements of the wheels and the thills. If one or both of the rubber bands 21 should break, the seat portion of the cart body 19 will be supported by the upper tie rods 17, 18, which thus, in the shown case, also serve as safety bars for the cart body. Through the mutually pivoting relationship between the thills 6 also the strains on the horse are substantially reduced.

As appears from FIG. 2 a traction line 23 is mounted to the thills 6. The traction line 23 is movable in relation to the thill construction and runs along it in guide means, e.g. brackets 24, and over two pulleys 25, which are rotatably journalled to the rear part of the thill fork, e.g. adjacent the connecting member 12. The two ends of the traction line 23 are provided with loops 26 to be fastened to the harness of the horse. Through this construction the traction line follows the horse's movements in relation the cart and therefore causes no wear injuries to the breast part of the horse through rubbing of the harness breast strap.

As mentioned above the training cart may be provided with a hydraulic loading device. The latter may, for example, be arranged such that two cooperating loading devices 27 act upon a cart wheel 2 each. Each loading device 27 may comprise a hydraulic pump 28, to the rotation axis of which a wheel 29 is fixed, which can be brought to engage the cart wheel 2. The wheel 29 preferably has a rubber tyre which may be solid or of an inflatable type. An example of how the loading system may be arranged appears schematically from FIG. 4. The two hydraulic pumps 28 are each via a pressure line 30 connected to an adjustable loading device 31, e.g. a needle or ball valve. From the valve 31 a pressure line 32 leads to an hydraulic fluid reservoir 33. From the reservoir 33 a suction line 34 goes back to each hydraulic pump 28. The pressure conduit 32 between the control valve 31 and the hydraulic fluid reservoir 33 may possibly be arranged as a heating coil in the cart body 19, e.g. in the bottom section thereof. Preferably, however, such a coil 35 is part of a branch 36, which can be connected through a directional valve 37, e.g. a three-way valve. The loading valve 31 and the directional valve 37 are arranged to be easily accessible to the driver, e.g. in an actuating device 38 attached, for example, to one side of the cart body 19. The hydraulic fluid reservoir 33, which e.g. may hold about 2 liters, may suitably be arranged in one of the thills 6 (not shown). The hydraulic loading devices 27 are preferably arranged in such a way that they, when necessary, can be completely disengaged from the cart wheels 2. This may be achieved by having each device 27—as schematically indicated in FIG. 1 and 2—supported by a frame or cradle 39, which at the end not supporting the loading device 27 is rotatably mounted to the wheel fork 3. The cradle 39 is preferably spring biased (not shown) against the wheel fork 3 and can via a suitably arranged eccentric device be rocked to bring the wheel 29 of the loading device 27 into or out of engagement, respectively, with the cart wheel 2. The eccentric device may e.g. be actuated by a line coupled to a lever, which is placed to be easily accessible to the driver, e.g. in connection to the actuator 38 mentioned above. In case of engagement between the wheels 29 and the cart wheels 2 the wheel rotations cause a downward force pressing the loading devices 27 downwards. To prevent twisting out of engagement suitable stops (not shown) are arranged at the cradles 39 or the wheel forks 3.

FIG. 5 shows in more detail an example of an arrangement of the loading devices 27 wherein a control lever is mounted adjacent to each loading device. Also in this case the loading devices 27 are supported on each side of the cart by a frame or cradle 39. The latter is in the Figure comprised of two parallel, elongate frame members 41 fixed to a base plate 42. At one end of the frame members 41 an end plate 43 is arranged essentially perpendicular to the base plate 42, and may possibly be intergral with the base plate 42. Two brackets 44 are fixed to the end plate 43, which support the shaft 45 of the above mentioned wheel 29, and a recess for the wheel 29 is provided in the plate 43. Crosswise to the end plate 43 a mounting plate 46 for the hydraulic pump 28 is attached to the plate 43, the hydraulic pump being operatively connected to the shaft 45 of the wheel 29. At the other ends the frame members 41 protrude from the base plate 42 and straddle a holder 47, in which they are pivotally journalled to be rocked in a vertical plane. The holder 47 is fixed to a plate 48, which in turn is fixed to the wheel fork 3. In a central part of the two frame members 41 a control lever 49 is pivotally journalled through a shaft 50. The lower end of the control lever 49 projects through a slot in the base plate 42 to contact the plate 48, so that by moving the control lever the cradle 39 is rocked against or away from the wheel fork plate 48 depending on the position of the lever. As described above the cradle 39 is spring biased in such a way that the wheel 29 tends to contact the cart wheel 2. This may e.g. be achieved by journalling the ends of the frame members 41 in the holder 47 by means of a torsion spring, or by loading the ends of the frame members with a leaf spring. By means of the control lever 49 the biasing force can be counteracted. When the control lever 49 is moved to the position shown in FIG. 5, its end presses against the plate 48, so that the driving wheel 29 is disengaged from the cart wheel 2. In such a way a simple and reliable engagement and disengagement of the loading device is accomplished. In the embodiment shown in FIG. 5 the above mentioned heating coil of the cart body 19 is not contemplated and the control unit 38 in this case therefore only includes the control valve 31 and a pressure gauge 51 for reading the set load.

Through the above described loading device constructions the cart wheels 2 will on engagement of the loading means 27 be loaded uniformly, and the load can be controlled steplessly by the control valve 31. Due to the flexible construction of the training cart substantially the same braking action is obtained on the wheels, the wheels to the fullest possible extent sticking to the ground essentially independent of the kind or condition of the road surface. A suitable load interval is e.g. 0–400 kp. The load work is essentially transferred to the hydraulic fluid which is heated. The generated heat is cooled off but may, as mentioned above, be used for heating the cart body. The heating coil 35 is then, when necessary, connected through operation of the directional valve 37. The cart body 19 may suitably be provided with a cover, so that in cold and damp weather the driver may sit warm and dry from his waist to his feet. As mentioned above the cart gets a built-in dray function through the stepless hydraulic brake device. In addition to the above mentioned injuries to the horse which are associated with the pulls and jerks obtained with the hitherto used dray objects, also the dust-clouds which particularly in the summer-time usually follow in the draying track are eliminated.

In FIG. 5 the thills 6 are represented as divided into a fore part 6a and a rear part 6b connected by means of a tee member 52, e.g. by means of bolt connections 53. The tee member 52 then also comprises the tube part 13, in which the connecting tube 12 is journalled in a suitable way, e.g. as described above. Due to the division of the construction into several parts in this way, damaged parts may easily be replaced, the cart will easily be dismountable into smaller parts, which facilitates transport, and the construction will also be more rigid.

The above described training cart can be made very light. It may, for example, will full equipment be given almost the same weight properties as the extremely light so-called "speed-cars" which are used for speed training. Possibly the cart may be provided with an alternative interchangeable seat structure of the simpler type used in these speed-cars, but which also is suspended in the advantageous way according to the invention. It is then possible, when desired, to quickly change between a more robust training cart and a correspondingly convenient speed-car for pure speed training. The invention is, of course, not restricted to the above particularly described and shown embodiments, but many variations and modifications are possible within the scope of the subsequent claims.

What I claim is:

1. A two-wheeled cart for training trotters, wherein the cart frame comprises two longitudinal rigid thill members, which at a central part thereof are pivotally connected through a cross connecting member to be vertically rotatable in relation to each other, wherein each wheel is individually resiliently suspended at a rear part of the respective thill member, and wherein a seat supporting cart member is separately resiliently supported by the cart frame.

2. A cart according to claim 1, wherein the fore part of the seat supporting cart member is supported by the cross connecting member and rotatably mounted in relation to the thills in a horizontal cross direction thereof, the rear part thereof being suspended in the thills through resilient means.

3. A cart according to claim 2, wherein the seat supporting cart member in addition is pivotally mounted in relation to the cross connecting member for rotation about an axis in the longitudinal direction of the cart.

4. A cart according to claim 1, wherein each wheel is suspended by a rigid supporting frame, the fore end of which is pivotally connected to a central part of the respective thill, and the rear part of which is connected to the rear part of the thill through resilient means.

5. A cart according to claim 4, wherein the thill members and the supporting frames on either side of the cart are connected through a pivoted tie rod construction.

6. A cart according to claim 1, further comprising hydraulic pump means driven by the wheels and adapted for controllable loading of the wheels, said hydraulic pump means comprising an adjustable check valve for steplessly adjustable control of the wheel load.

7. A cart according to claim 6, wherein the hydraulic pump means comprise one hydraulic pump member for each cart wheel, each hydraulic pump member being operatively connected to a rotatable member, arranged to be brought against the respective cart wheel.

8. A cart according to claim 7, wherein said hydraulic pump members are operatively connected to each other.

9. A cart according to claim 1, further comprising a traction line running freely along the thills from the fore ends thereof and between the thills at the central parts thereof, the traction line at said central parts running over conducting means, including freeley rotatably pulleys.

10. A cart according to claim 2, wherein each wheel is suspended by a rigid supporting frame, the fore end of which is pivotally connected to a central part of the respective thill, and the rear part of which is connected to the rear part of the thills through resilient means, and wherein each supporting frame supports a hydraulic loading device, said loading devices each comprising a hydraulic pump member operatively connected to a rotatable member, means for bringing said rotatable member into and out of engagement with the respective cart wheel, and control means for stepless variation of the loading pressure of the hydraulic pump members, said hydraulic pump members being operatively interconnected through a hydraulic reservoir.

* * * * *